Sept. 11, 1962  M. L. ABEL  3,053,588
BEARING
Filed Sept. 7, 1960

INVENTOR
MARTIN L. ABEL

BY Lane & Aitken
ATTORNEY

3,053,588
BEARING
Martin L. Abel, Oak Park, Mich., assignor to The Tann Corporation, Detroit, Mich., a corporation of Michigan
Filed Sept. 7, 1960, Ser. No. 54,494
7 Claims. (Cl. 308—121)

This invention relates to bearings, and more particularly to a bearing having an annular reservoir surrounding the bearing surfaces in which a lubricant-impregnated wicking material may be placed to supply lubricant to the bearing surface.

A bearing of the type of the present invention is disclosed in U.S. Letters Patent No. 2,761,746, issued to Martin L. Abel on September 4, 1956.

The construction of the bearing of the present invention permits the parts to be stamped or rolled from flat stock whereas formerly many of the parts had to be molded, cast and machined. Consequently the bearing of the present invention is of a much more economical construction, yet it functions just as well as the bearings of the prior art.

Accordingly, it is an object of this invention to provide a bearing structure which can be more economically produced than the bearings of the prior art.

It is another object of this invention to provide a bearing structure in which the parts can be made from flat stock.

It is a further object of this invention to provide a bearing which is simple in construction and which can be easily assembled.

It is a still further object of this invention to provide a more economical bearing without sacrificing any quality.

Further objects and advantages of the present invention will become readily apparent as the following detailed description of the invention unfolds and when taken in conjunction with the drawings wherein.

Figure 1:
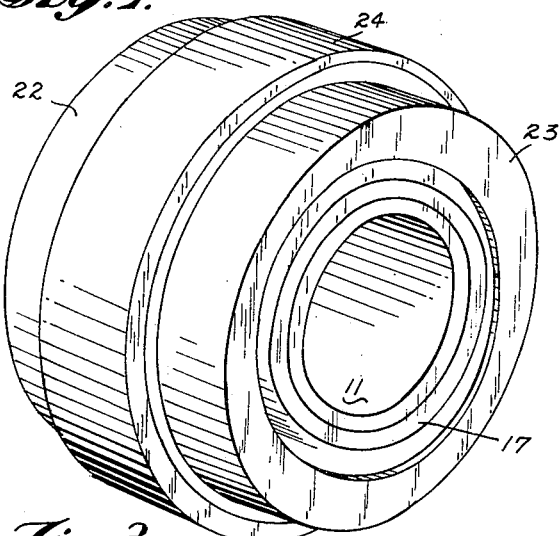
FIG. 1 illustrates a perspective view of the bearing.
Figure 2:
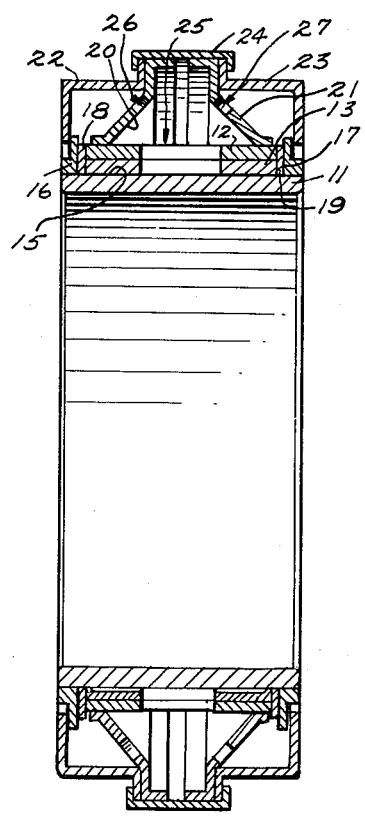
FIGS. 2 and 3 illustrate sectional views of the bearing.
Figure 3:
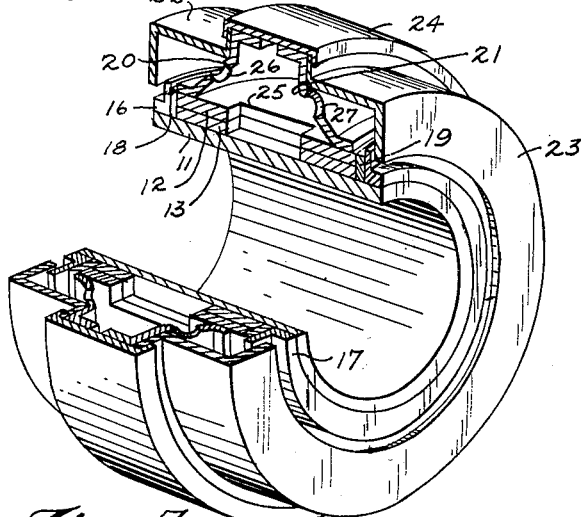

As shown in FIGS. 1, 2 and 3, the bearing of the invention comprises a steel sleeve 11 which is adapted to receive a rotating or rotatable shaft, to which the sleeve 11 will be fixed. The sleeve 11 rotates within a steel sheet metal sleeve 12 having a babbit liner 13. The inner surface of the babbit liner 13 and the outer surface of the sleeve 11 comprise cooperating bearing surfaces 15. The sleeve 12 is rolled from flat stock and has a butt seam. Steel oil slingers 16 and 17 are fixed to the outer surface of the sleeve 11 outside the ends of the sleeve 12 and function to throw radially outward the lubricant which spreads to the oil slingers from the bearing surfaces 15. Nylatron thrust washers 18 and 19 are fixed to the ends of the sleeve 12 to provide axial stability to the bearing.

Steel sheet metal annular members 20 and 21 are brazed to the sleeve 12 and flare radially therefrom toward each other to define an annular reservoir around the sleeve 12 and the bearing surfaces 15. As shown in FIGS. 2 and 3, the annular members 20 and 21 flare toward each other near the sleeve 12 and have near their outer extremities radial walls extending perpendicular to the axis of the bearing surfaces 15. The annular members 20 and 21 also have cylindrical walls, which make right angle bends with the radial walls and which comprise the outer extremities of the annular members 20 and 21. Steel sheet metal cups 22 and 23 have radially extending walls which abut against the radial walls of the annular members 20 and 21, respectively. The cups 22 and 23 are annular in shape and overlap the oil slingers 16 and 17 to catch the lubricant thrown out radially by the oil slingers 16 and 17. The cups 22 and 23 extend away from the annular members 20 and 21 in a direction parallel to the axis of the bearing surfaces 15 and are bent to extend inwardly perpendicular to the axis of the bearing surfaces 15 at the ends of the sleeve 11 overlapping the oil slingers 16 and 17. The annular members 20 and 21 and the cups 22 and 23 can all be pressed from flat stock. A steel sheet metal band 24 is brazed to the outer surfaces of the cylindrical walls of the annular members 20 and 21 and closes off the annular reservoir defined thereby. The band 24 is rolled from flat stock and has a butt seam. The band 24 extends out beyond the right angle bends in the annular members 20 and 21 and its rims are rolled over the radially extending walls of the cups 22 and 23 abutting against the radial walls of the annular members 20 and 21. This rolling over of the rims of the band 24 secures the cups 22 and 23 to the assembly.

A lubricant-impregnated wicking material is positioned around the bearing surfaces 15 in the reservoir defined by the annular members 20 and 21. Lubricant is supplied to the bearing surfaces 15 from the lubricant-impregnated wicking material through an elongated window 25 defined through the sleeve 12 and its babbit liner 13. Holes 26 and 27 defined through the annular members 20 and 21 are circumferentially spaced around the annular members 20 and 21 to permit the flow of lubricant from the cups 22 and 23 to the reservoir defined by the annular members 20 and 21.

Figure 4:
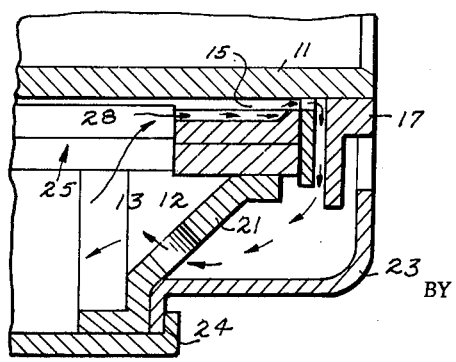
FIG. 4 is an enlarged showing of part of the bearing illustrating the flow of lubricant in the bearing structure.

As shown in FIG. 4, which is an enlarged view of the bearing structure illustrating the flow of lubricant in the bearing, the lubricant passes through the elongated window 25 to the bearing surfaces 15 where it is distributed over the entire bearing surfaces. Grooves 28 facilitate the distribution of the lubricant over the bearing surfaces. When the lubricant spreads beyond the outer edges of the bearing surfaces, it comes into contact with the oil slingers 16 and 17 and is thrown out into the cups 22 and 23. The lubricant collects in cups 22 and 23 by gravitation and is fed through the holes 26 and 27 on the lower side of the bearing to the wicking material in the reservoir defined by the annular members 20 and 21. From the wicking material the lubricant is then again fed through the elongated window 25 to the bearing surfaces.

Thus it will be seen from the above description that the bearing of the invention will function with the same excellence as those of the prior art. Yet, since the parts are pressed or rolled from flat stock, the bearing is much cheaper to produce and thus constitutes a great improvement over the bearings of the prior art.

Many modifications may be made to the above described specific embodiment of the invention without departing from the spirit and scope of the invention, which is limited only as defined in the appended claims.

What is claimed is:

1. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, a pair of sheet metal annular members fixed to said first sleeve and extending radially outward and towards each other to define with the outer surface of said first sleeve an annular reservoir, said annular members each having a radial wall perpendicular to the axis of said bearing surfaces and a cylindrical wall parallel to the axis of said bearing surfaces making a right angle bend with said radial wall, the cylindrical walls of said annular members comprising the outer radial extremities of said annular members, a pair of sheet metal annular cups positioned to overlap said oil slingers to catch the lubricant thrown out by said oil slingers, said cups having radially extending walls abutting against the radial walls of said annular members, and an annular sheet metal band fixed to the cylindrical walls of said annular members closing off said reservoir and having its rims rolled over the right angle bends in said annular members and over the radially extending walls of said cups to secure said cups to the assembly, said first sleeve having a window defined therein to permit the passage of lubricant from said reservoir to said bearing surfaces, said annular members having means defined therein to permit the passage of lubricant from said cups to said reservoir.

2. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, a pair of sheet metal annular members brazed to said first sleeve and extending radially outward and towards each other to define with the outer surface of said first sleeve an annular reservoir, said annular members each having a radial wall perpendicular to the axis of said bearing surfaces and a cylindrical wall parallel to the axis of said bearing surfaces making a right angle bend with said radial wall, the cylindrical walls of said annular members comprising the outer radial extremities of said members, a pair of sheet metal annular cups positioned to overlap said oil slingers to catch the lubricant thrown out by said oil slingers, said cups having radially extending walls abutting against the radial walls of said annular members, and an annular sheet metal band brazed to the cylindrical walls of said annular members closing off said reservoir and having its rims rolled over the right angle bends in said annular members and over the radially extending walls of said cups to secure said cups to the assembly, said first sleeve having a window defined therein to permit the passage of lubricant from said reservoir to said bearing surfaces, said annular members having means defined therein to permit the passage of lubricant from said cups to said reservoir.

3. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, a pair of sheet metal annular members fixed to said first sleeve and extending radially outward and towards each other to define with the outer surface of said first sleeve an annular reservoir, a pair of sheet metal annular cups abutting against said annular members and positioned to overlap said oil slingers to catch the lubricant thrown out by said oil slingers, and an annular sheet metal band fixed to the outer extremities of said annular members closing off said reservoir and having its rims rolled over parts of said cups to secure said cups to the assembly, said first sleeve having a window defined therein to permit the passage of lubricant from said reservoir to said bearing surfaces, said annular members having means defined therein to permit the passage of lubricant from said cups to said reservoir.

4. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, sheet metal means defining with the outer surface of said first sleeve an annular reservoir around said first sleeve and said bearing surfaces, said sheet metal means having radial walls extending perpendicular to the axis of said bearing surfaces and defining an outer cylindrical surface making right angle bends with said radial walls, said outer cylindrical surface comprising the outer extremity of said sheet metal means, a pair of sheet metal annular cups positioned to overlap said oil slingers to catch the lubricant thrown out by said oil slingers, said cups having radially extending walls abutting against the radial walls of said sheet metal means, and an annular sheet metal band fixed to said outer cylindrical surface of said sheet metal means and having its rims rolled over the right angle bends in said sheet metal means and over the radially extending walls of said cups securing said cups to the assembly, said first sleeve having a window defined therein to permit the passage of lubricant from said reservoir to said bearing surfaces, said sheet metal means having means defined therein to permit the passage of lubricant from said cups to said reservoir.

5. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, a pair of sheet metal annular members fixed to said first sleeve and extending radially outward and towards each other to define with the outer surface of said first sleeve an annular reservoir, the outer radial extremities of said annular members comprising cylindrical walls about the axis of said bearing surfaces, a sheet metal band fixed to the cylindrical walls of said annular members closing off said reservoir, and a pair of sheet metal annular cups fixed to the assembly of said annular members and said band and positioned to overlap said oil slingers to catch the lubricant thrown out by said oil slingers, said first sleeve having a window defined therein to permit the passage of lubricant from said reservoir to said bearing surfaces, said annular members having means defined therein to permit the passage of lubricant from said cups to said reservoir.

6. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, a pair of sheet metal annular members fixed to said first sleeve and extending radially outward and towards each other to define with the outer surface of said first sleeve an annular reservoir, a sheet metal band fixed to the outer extremities of said annular members closing off said reservoir, and sheet metal annular cups fixed to the assembly of said annular members and said band and positioned to overlap said oil slingers to catch the lubricant thrown out by said oil slingers, said first sleeve having a window defined therein to permit the passage of lubricant from said reservoir to said bearing surfaces, said annular members having means defined therein to permit the passage of lubricant from said cups to said reservoir.

7. A bearing comprising a first sleeve, a second sleeve rotatable within said first sleeve, the inner surface of said first sleeve and the outer surface of said second sleeve comprising cooperating bearing surfaces, oil slingers fixed to said second sleeve on the outer surface of said second sleeve outside the ends of said first sleeve and adapted to throw radially outward the lubricant which spreads to said oil slingers from said bearing surfaces, sheet metal means defining with the outer surface of said first sleeve an annular reservoir around said first sleeve and said bearing surfaces, and sheet metal annular cups fixed to said sheet metal means and positioned to overlap said oil slingers to catch the lubricant thrown out by said oil slingers, said first sleeve having a window defined therein to permit the passage of lubricant from said reservoir to said bearing surfaces, said sheet metal means having means defined therein to permit the passage of lubricant from said cups to said reservoir.

References Cited in the file of this patent

UNITED STATES PATENTS

| | | |
|---|---|---|
| 2,035,519 | Apple | Mar. 31, 1936 |
| 2,761,747 | Abel | Sept. 4, 1956 |

FOREIGN PATENTS

| | | |
|---|---|---|
| 457,149 | Canada | May 31, 1949 |